United States Patent
Kolze

(10) Patent No.: US 7,197,096 B2
(45) Date of Patent: Mar. 27, 2007

(54) COMPENSATION OF REFERENCE FREQUENCY DRIFT IN SYSTEM REQUIRING CRITICAL UPSTREAM TIMING

(75) Inventor: Thomas J. Kolze, Phoenix, AZ (US)

(73) Assignee: Broadcom Corporation, Irvine, CA (US)

(*) Notice: Subject to any disclaimer, the term of this patent is extended or adjusted under 35 U.S.C. 154(b) by 768 days.

(21) Appl. No.: 10/136,060

(22) Filed: Apr. 30, 2002

(65) Prior Publication Data

US 2002/0186803 A1 Dec. 12, 2002

Related U.S. Application Data

(63) Continuation-in-part of application No. 10/000,415, filed on Nov. 2, 2001.

(60) Provisional application No. 60/296,884, filed on Jun. 8, 2001.

(51) Int. Cl.
*H04L 7/00* (2006.01)
(52) U.S. Cl. .................................................. 375/358
(58) Field of Classification Search ................ 375/358, 375/354, 377, 222, 219; 455/73, 557, 550.1; 725/105, 109, 111
See application file for complete search history.

(56) References Cited

U.S. PATENT DOCUMENTS

| | | | |
|---|---|---|---|
| 6,031,847 A | 2/2000 | Collins et al. | |
| 6,275,497 B1 * | 8/2001 | Varma et al. | 370/431 |
| 6,377,640 B2 * | 4/2002 | Trans | 375/354 |
| 6,580,751 B1 * | 6/2003 | Gardner et al. | 375/222 |
| 6,735,454 B1 * | 5/2004 | Yu et al. | 455/574 |

FOREIGN PATENT DOCUMENTS

JP 63272237 A 11/1988

OTHER PUBLICATIONS

Marco Lops, *Narrow-Band-Interference Suppression in Multisuer CDMA Systems*; Sep. 1998; pp. 1163-1175.
Jeffrey A. Young, *Analysis of DFT-Based Frequency Excision Algorithms for Direct-Sequence Spread-Spectrum Communicaitons*, Aug. 1998; pp. 1076-1087.

* cited by examiner

*Primary Examiner*—Pankaj Kumar
(74) *Attorney, Agent, or Firm*—McAndrews, Held & Malloy, Ltd.

(57) ABSTRACT

Systems and methods are disclosed for to compensating reference frequency drift in a communications system having a plurality of modems and a headend, where the system requires critical upstream timing. One embodiment of the method includes learning or determining the relative delay of each modem and reporting each modem's unique delay (relative to the closest modem) to the headend. The method further includes the headend monitoring its own reference for frequency drift, the modem broadcasting pertinent frequency drift information to the modems and adjusting the modems' upstream timing to account for each modem's unique distance (i.e., delay) combined with the broadcast stream of frequency drift information.

6 Claims, 2 Drawing Sheets

COMPENSATION OF REFERENCE FREQUENCY DRIFT IN SYSTEM REQUIRING CRITICAL UPSTREAM TIMING

CROSS-REFERENCE TO RELATED APPLICATIONS

This application is a continuation-in-part of, and claims the benefit of and priority from, application Ser. No. 10/000,415 filed Nov. 2, 2001, titled "Detection and Mitigation of Temporary Impairments in a Communications Channel", which is related to, and claims the benefit of and priority from, Provisional Application No. 60/296,884 filed Jun. 8, 2001, titled "Detection and Mitigation of Temporary Impairments in a Communications Channel", the complete subject matter of each of which is incorporated herein by reference in its entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

The present invention relates to communications channels, all of which are inherently limited in their capacity (or rate) of information transfer by channel impairments. More specifically, the present invention relates to compensating reference frequency drift in a communications system between a plurality of Cable Modems (alternatively referred to as "CM") and a Cable Termination System (alternatively referred to as "CMTS" or "headend"), where the system requires critical upstream timing.

Communication systems are subjected to impairments, generally of a brief or transitory duration. One example of such impairment is often referred to by the generic term "noise." Noise sometimes emanates for example, from within electrical components themselves, such as amplifiers and even passive resistors. Another example of impairment is referred to as "interference," which is usually taken to be some unwanted manmade emission, from another communications system such as a radio or from switching circuits in a home or automobile for example. "Distortion" is a yet another example of such impairment, and includes linear distortion in the channel, such as pass-band ripple or non-flat group delay for example, and nonlinear distortion, such as compression in an overdriven amplifier for example. It is contemplated that there are many other types of impairments that may also adversely affect communications in a channel.

Often, such impairments may by dynamic in nature. In many cases, the impairment may be at one level of severity most of the time. In this instance, the communications system may be designed or optimized in some fashion to operate at that specific level of impairment. Occasionally, however, one or more impairments may become so severe as to preclude the operation of such communications system optimized for the more ordinary level of impairments.

Previously, when a large interference or burst of noise occasionally impinged upon the receiver (a CM for example), such large out-of-the ordinary bursts of received power are simply blanked out. Often, analog processing means are used, almost at, if not right at, the receiver input. This may be done especially to protect CMs or other sensitive receiver front-ends from damage. While this technique may provide some benefit in circumstances where the noise or interference power dwarfs the signal-of-interest power, it does not protect against the many other impairments that have power more on the order of the signal-of-interest power (or even much less). Thus blanking does not, by itself, provide the receiver with a means to improve its overall performance in the presence of the lost information, i.e., the information content concurrent with the large noise burst.

One known technique, a forward error correction technique (alternatively referred to as "FEC") has been applied, even unknowingly, to solve this problem. FEC techniques incorporate soft-decision decoding, such as is common with convolutional error correction codes and the Viterbi decoding algorithm. In such correction techniques, as the error power in the received signal increases, such increase is passed directly into the decision process.

Such encoding and decoding techniques have been in common practice for years, and are widely applied without thought to temporary fidelity changes in the channel. Fortunately, in the event of a change in the channel fidelity, the soft-decision decoding takes into consideration the larger error power in making signal decisions. However, unfortunately, often with a change in channel conditions, there is duration of multiple symbol intervals (in a digital communications system for example) where the degradation persists. During this time some symbols may be so severely erred that they actually appear close to another possible but incorrect symbol. In such event, the soft-decision decoder actually "thinks" it has received a low error power, and may rate the wrong signal with a high confidence. This becomes much more likely as the constellation density (of a QAM constellation for example) is increased for high rate communications, Additional techniques, such as a Time Division Multiple Access technique (alternatively referred to as "TDMA") have been applied to solve this problem. In this technique, one or more carrier frequencies are shared among a plurality of CMs. Known standards, DOCSIS 1.0 and 1.1 for example, each of which are incorporated herein by reference in their entirety, define the physical layer, and additional layers, in which a plurality of CMs transmit data upstream to and receive data downstream from the CMTS or headend. In this technique, each upstream carrier frequency or channel assignment is generally shared by a plurality of CMs, each being granted time slots wherein they may use the channel. These grants are allocated and made known to the CMs via the downstream broadcast transmissions. Some of the grants only enable a single CM to transmit, while other time slot grants are in contention mode. That is some, or all, of the CMs may attempt to use the grant. However, if more than one CM attempts to use a grant in the contention mode, all the CMs will likely be unsuccessful in channel use.

Yet another technique, such as a direct-sequence spread-spectrum modulation technique discussed by J. Young and J. Lehnert, in their paper titled "Analysis of DFT-Based Frequency Excision Algorithms for Direct-Sequence Spread-Spectrum Communications," *IEEE Trans. Comm.*, vol. 46, pp. 1076–1087, August 1998, the complete subject matter of which is incorporated herein by reference in its entirety, has also been applied to solve this problem. In this technique, frequency excision is used to eliminate narrow-band energy, thus enhancing the capacity of direct-sequence spread-spectrum modulation to reject narrow-band interference. However, this disclosed technique focuses on particular waveforms having energy concentrated about a narrow band.

Yet still another technique, such as a Code-Division Multiple Access technique (alternatively referred to as "CDMA") discussed by M. Lops, G. Ricci and A. Tulino, in their paper titled "Narrow-Band-Interference Suppression in Multi-user CDMA Systems," *IEEE Trans. Comm.*, vol. 46, pp. 1163–1175, September 1998, the complete subject matter of which is incorporated herein by reference in its entirety, has also been applied to this problem. In this technique, a decision is made regarding the bit(s) transmitted by each user over a communication system. This decision is based on the projection of the observables on to the orthogonal complement to the subspace spanned by the other users' signatures and the narrow-band interference. The disclosed technique recognizes that the blanking and iterative processing may be performed with an orthogonal basis set decomposition of the frequency domain.

Yet still a further technique, such as a Synchronous Code Division Multiple Access technique (alternatively referred to as "SCDMA") comprises a spreading technique to transmit symbols at the same time on the same frequency. More specifically, this technique may be used, in one embodiment, with a preliminary DOCSIS 2.0 physical layer standard (alternatively referred to as the "DOCSIS standard"), which is incorporated herein by reference in its entirety. The DOCSIS standard defines the physical layers in which pluralities of CMs transmit data upstream to and receive data downstream from the CMTS or headend.

It is contemplated that in SCDMA, the spreading codes may be cyclical shifts of one 127 chip spreading code, plus one additional chip. Thus, the spreadingIn On codes are nearly cyclical shifts of one another.

For SCDMA modulation to work efficiently, all the spreading codes should be synchronized as they arrive at the receiver (a CM for example). Timing misalignments result in inter code interference (alternatively referred to as "ICI"), which may degrade performance. It is known that aligning upstream transmissions from various CMs in a system to within +/−2 nanoseconds may limit such ICI. To accomplish this alignment, an SCDMA CMTS or headend may transmit downstream clock transmissions or reference timings that the various CMs may lock onto. Locking onto such downstream clock transmissions or reference timings enables the CMs to: (1) synchronize the upstream symbol transmissions with this downstream reference timing; (2) provide a frequency lock for the upstream CMs; (3) provide feedback in the initial ranging; and (4) make subsequent measurements available to the various CMs (from the CMTS), providing for correction of the unique delay (i.e., phase) for each CM, and enabling each CM to fall into the required +/−2 nanosecond alignment. In other words, locking onto the downstream symbol clock provides the CM with the necessary frequency information, and the initial (and relatively infrequent) subsequent timing correction measurements needed to provide the phase information to each CM.

The DOCSIS Standard provides standards for allocation of jitter and stability for the CMTS reference clock and downstream symbol clock to facilitate the CMs locking onto such downstream clock transmissions or reference timings. This Standard also sets forth fidelity requirements for the CM in recovering and "turning around" this downstream symbol clock.

Various impairments, interference, distortion or noise in the channel may degrade signal performance. In one embodiment, special techniques may be employed to limit or mitigate the degradation by compensating for reference frequency drift in a communications system.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Features of the present invention relate to a system and method for compensating for reference frequency drift in a communications system having a plurality of modems and a headend, where the system requires critical upstream timing. One embodiment of the method includes learning or determining the relative delay of each modem and reporting each modem's unique delay (relative to the closest modem) to the headend. The method further includes the headend monitoring its own reference for frequency drift, the modem broadcasting pertinent frequency drift information to the modems and adjusting the modems' upstream timing to account for each modem's unique distance (i.e., delay) combined with the broadcast stream of frequency drift information.

Another embodiment of the present invention relates to a communication system adapted to mitigate timing offset in return transmissions. In this embodiment, the system comprises at least one modem and a headend adapted to determine relative delay of the modem and monitor its own reference for frequency drift. The modem is adapted to adjust its upstream timing to account for such delay.

These and other advantages and novel features of the present invention, as well as details of an illustrated embodiment thereof, will be more fully understood from the following description and drawings.

DETAILED DESCRIPTION OF THE INVENTION

Figure 1:
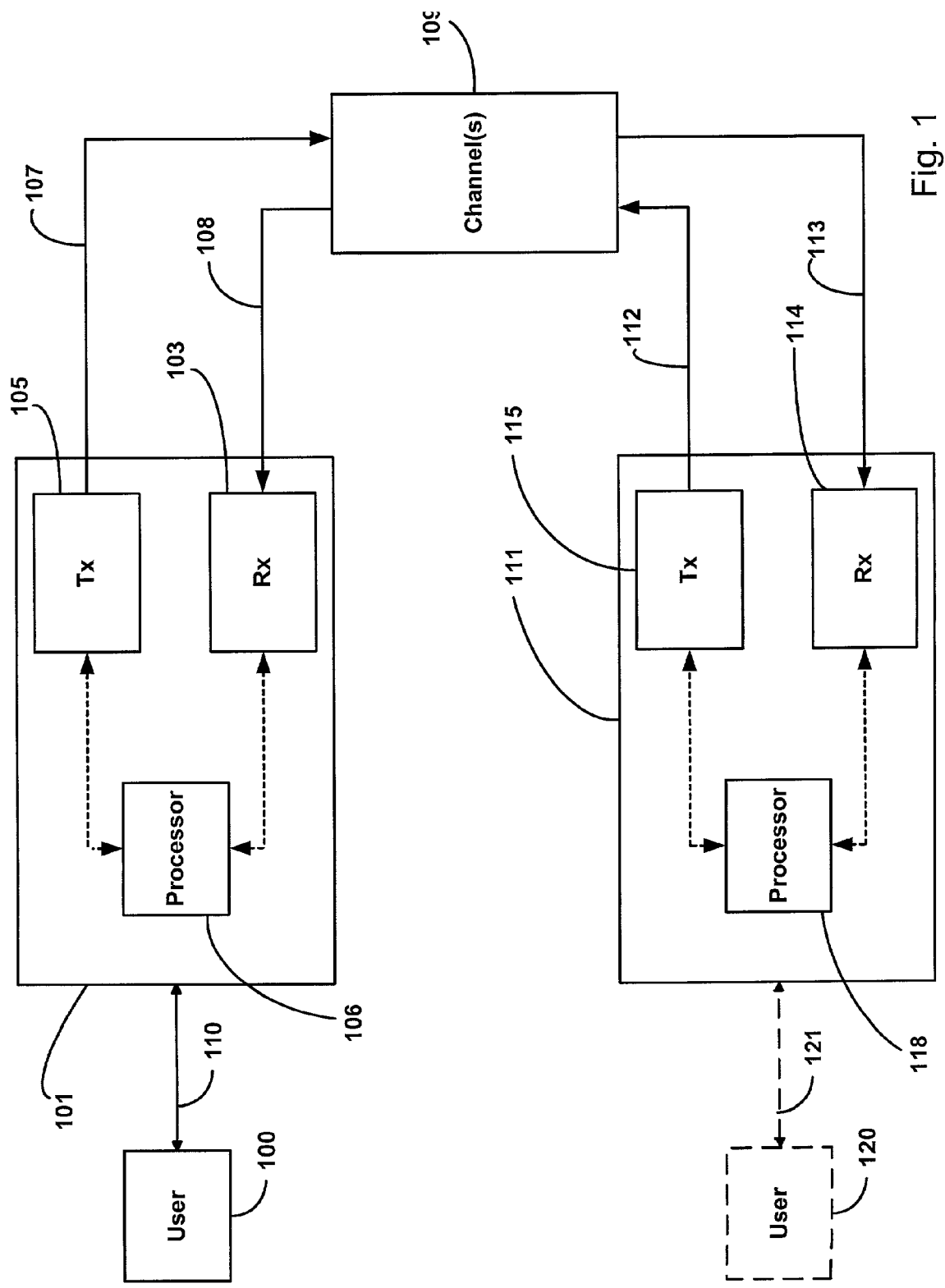
FIG. 1 illustrates a block diagram of a generic communication system that may be employed in connection with the present invention.

The following description is made with reference to the appended figures.

In one embodiment of the present invention using SCDMA modulation, up to 128 spreading codes are available for modulating each upstream-transmitted symbol. In this embodiment, up to 128 symbols may be transmitted simultaneously, each symbol using its own spreading code. Each spreading code consists of a sequence of +1 or −1 valued chips, such that there are 128 such chips in each spreading code. In this embodiment, the symbol amplitude and angle are modulated using a vector, applying the vector or its additive inverse (i.e., 180 degree rotation) to the symbol.

In one embodiment, the spreading codes are orthogonal if perfectly time-aligned, and thus the 128 symbols will not interfere with each other, even though they are transmitted at the same time on the same channel. For example, two waveforms are orthogonal to each other if, after multiplying them by each other and integrating, the result of the integration is zero. In SCDMA modulation used with one embodiment of the present invention, at least one but up to and including 128 spreading codes may be used at one time. These spreading codes may be allocated to one CM for example, such that CM is granted all the spreading codes (128 for example), up to and including the spreading codes being allocated to 64 different CMs for example, such that two spreading codes are granted to each CM. QAM symbols of two bits per symbol and more are spread with the assigned codes, one spreading code per QAM symbol, although other arrangements are contemplated.

For SCDMA modulation to work efficiently, all the spreading codes should be synchronized as they arrive at the receiver (a CM for example). Timing misalignments result in ICI, which may degrade channel performance. It is known that aligning upstream transmissions from various CMs in a system to within +/−2 nanoseconds may limit such ICI. To accomplish this alignment, an SCDMA CMTS or headend may transmit downstream clock transmissions or reference timings that the various CMs may lock onto. Locking onto such downstream clock transmissions or reference timings (i.e., locking onto the downstream symbol clock) provides each CM with the necessary frequency information, and the initial subsequent absolute timing correction measurements needed to provide phase information for each CM, and enabling each CM to fall into the +/−2 nanosecond alignment.

The DOCSIS Standard provides standards for allocation of jitter and stability for the CMTS reference clock and downstream symbol clock, facilitating the CMs locking onto such downstream clock transmissions or reference timings. This Standard also sets forth fidelity requirements for the CM in recovering and "turning around" this downstream symbol clock.

It is contemplated that the maximum "distance" in the two-way propagation delay of "near" and "far" CMs (i.e., CMs that are near to or far from the CMTS) is one important element in mitigating ICI in the channel. For example, such two-way propagation delay may be about one millisecond. Furthermore, the CMTS timing reference may oscillate with a 500 Hz sinusoidal phase modulation. The combination of such propagation delay and CMTS phase modulation means that, even if every CM tracks and "turns around" the CMTS downstream symbol timing perfectly, the "near" and "far" CMs return this timing modulation 180 degrees out-of-phase owing to the one millisecond difference in propagation delay. If the phase modulation is on the order of 2 nanoseconds peak-to-peak, then the entire CMTS's timing difference budget of +/−2 nanoseconds is used.

One embodiment of the present invention relates to mitigating ICI in communications channels. More specifically, one embodiment of the present invention relates to compensating reference frequency drift in a communications channels between one or more CMs and a CMTS or headend, where the channel requires critical upstream timing.

FIG. 1 illustrates a block diagram of a generic communication system that may be employed in connection with one embodiment of the present invention. The system comprises a first communication node 101, a second communication node 111, and at least one channel 109 that communicatively couples the nodes 101 and 111. The communication nodes may be, for example, cable modems, DSL modems or any other type of transceiver device that transmits or receives data over one or more channels (generally referred to as CMs).

The first communication node 101 comprises a transmitter 105, a receiver 103 and a processor 106. The processor 106 may comprise, for example, a microprocessor. The first communication node 101 communicates with or is communicatively coupled to a user 100 (e.g., a computer) via communication link 110, and to the channel 109 via communication links 107 and 108. Of course, communication links 107 and 108 may be combined into a single communication link.

Similarly, the second communication node 111 comprises a transmitter 115, a receiver 114 and a processor 118. The processor 118, like processor 106, may comprise, for example, a microprocessor. The second communication node 111 likewise is communicatively coupled to the at least one channel 109 via communication links 112 and 113. Again, like communication links 107 and 108, the communication links 112 and 113 may be combined into a single communication link. The communication node 111 may also be communicatively coupled to a user 120 (again a computer, for example) via communication link 121. In the case when communication node 111 is a headend, for example, user 120 may not be present.

During operation of the illustrated embodiment of FIG. 1, the user 100 may communicate information to the user 120 (or the headend) using the first communication node 101, the at least one channel 109 and the second communication node 111. Specifically, the user 100 communicates the information to the first communication node 101 via communication link 110. The information is transformed in the transmitter 105 to match the restrictions imposed by the at least one channel 109. The transmitter 105 then communicates the information to the at least one channel 109 via communication link 107.

The receiver 114 of the second communication node 111 receives, via communication link 113, the information from the at least one channel 109 and transforms it into a form usable by the user 120. Finally, the information is communicated from the second communication node 111 to the user 120 via the communication link 121.

Communication of information from user 120 to user 100 may also be achieved in a similar manner. In either case, the information transmitted/received may also be processed using the processors 106/118.

One embodiment of the present invention relates to compensating reference frequency drift in a communications channel or system (similar to any of the channels or systems discussed previously) having a plurality of CMs and a CMTS, where the system requires critical upstream timing. More specifically, embodiments of the present invention relate to mitigating timing offsets of the distant CMs in the system arising due to CMTS frequency drift.

In addition to providing the standards for spectral distribution and limitation on phase noise or jitter, the DOCSIS Standard also sets forth the frequency drift specification for the CMTS reference clock, which in one embodiment is limited to $1e^{-8}$ per second. This means that, when compared to an initial frequency that is perfectly maintained for example, the time (or equivalently, the phase) will be different after about one second by no more than about 10 nanoseconds (due to frequency drift or ramping). For example, on a 5 MHz clock, such frequency drift results in an accumulation of about 10/200=0.05 cycles=18 degrees. It is contemplated that the (nominal) 5 MHz clock frequency is ramping at about +/−0.1 Hz/second, producing the 0.05 cycle timing or phase drift after one second. Equivalently, the reference frequency is drifting at up to about +/−0.02 ppm/second.

It is contemplated that such frequency drift between CMTS and CMs may be fairly benign, and is superior to (i.e., lower in magnitude) to the frequency drift of known low-cost oscillators. Furthermore, it is contemplated that such frequency drift is achievable, considering that the frequency drift is used as a reference device at the CMTS rather than the individual CMs.

It is contemplated that known communication systems have not taken into account the combination of such factors as: (1) the low amount of frequency drift at the CMTS; (2) the differential propagation delay of about one millisecond between "near" and "far" CMs; and (3) the CMTS providing ranging updates (i.e., timing updates or feedback) up to about 30 seconds to each CM, thus maintaining timing alignment and minimizing ICI.

For example, it is contemplated that a downstream symbol reference provided by the CMTS is about 5 MHz and is ramping at about 0.1 Hz/second. A CM that returns that reference perfectly (except for about a one millisecond delay), returns that reference with timing on roughly 5 MHz symbols that is continually too low. In this example, such timing is too low by about 0.1 Hz/second×$10^{-3}$ seconds=$10^{-4}$ Hz.

If the next phase (i.e., timing) feedback for the distant CM doesn't occur until after about 30 seconds have elapsed, about 0.003 cycles of timing misalignment will have accrued, which is about 0.6 nanoseconds for the 200 nanosecond period of the 5 MHz symbol rate. The highest upstream symbol rate set forth in the DOCSIS Standard is actually 5.12 Msymbols/second, with about a 195 nanosecond symbol duration. The downstream symbol rates are between about 5.06 Msym/second and 5.36 Msym/second.

Thus, it is demonstrated that the parameters set forth in the DOCSIS Standard—the allowed CMTS frequency drift, combined with the allowed propagation delay differences and the 30 second interval for updating the CMs upstream timing with the CMTS feedback for example—results in about a 0.6 nanosecond timing error (in comparison to a CM that doesn't experience any delay back to the CMTS). Ultimately, this results in 15% of the total timing misalignment budget being thrown around.

It may be demonstrated that, if the frequency of the 5 MHz downstream symbol rate slews at 0.1 Hz/second for 15 seconds, then stabilizes at the new frequency (1.5 Hz higher for example), roughly 0.3 nanoseconds of timing error is accrued by the distant CM. It is contemplated that such timing error may be reconciled at the next timing update or feedback opportunity, but such error persists even though the frequency of the CMTS has stabilized.

Figure 2:
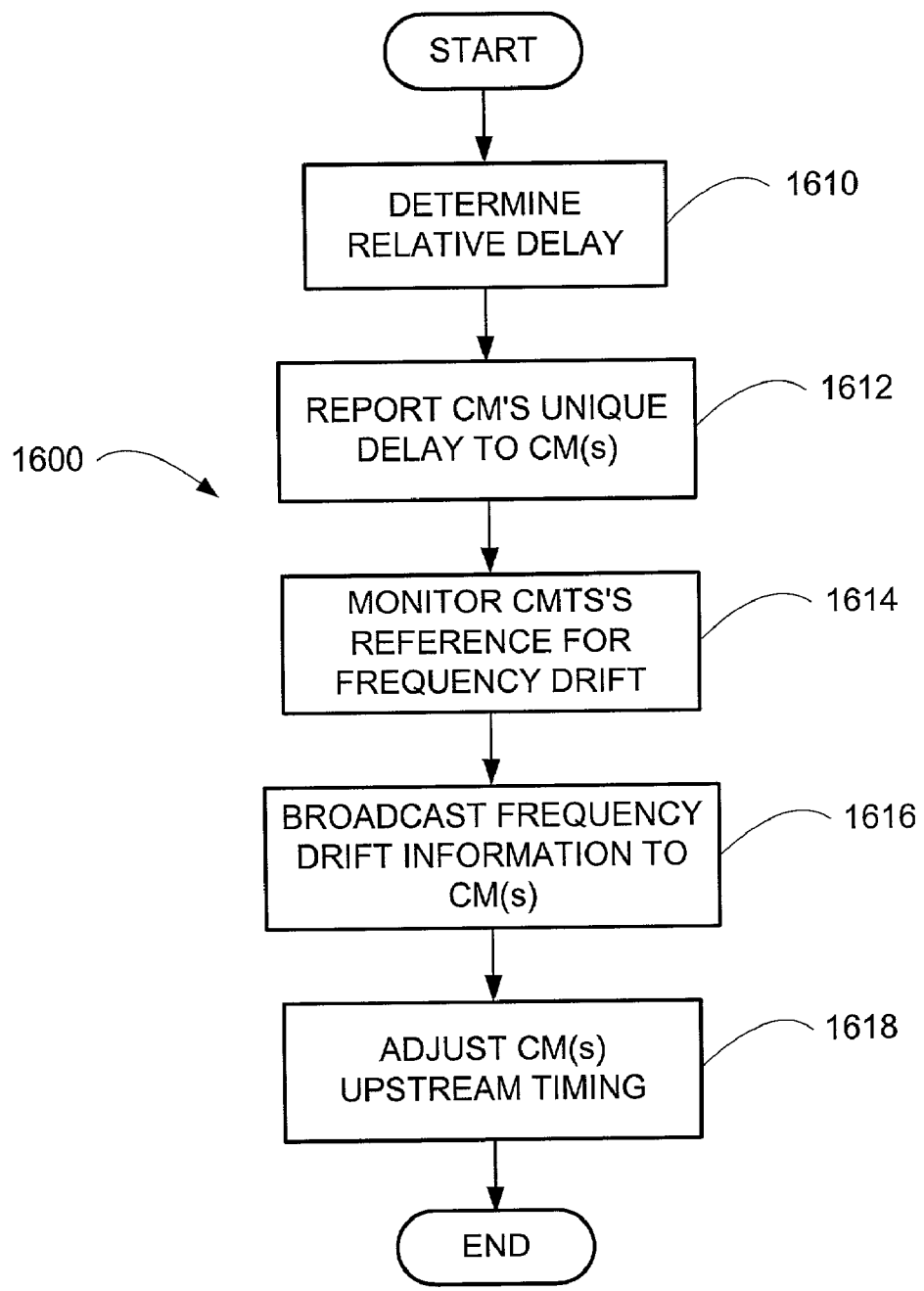
FIG. 2 illustrates a flow diagram of one embodiment of a method that may be used to mitigate frequency drift in communication systems in accordance with the present invention.

In accordance with one embodiment of the present invention illustrated in FIG. 2, such timing offset of the distant CMs arising due to CMTS frequency drift may be mitigated. One method, generally designated 1600, for mitigating such timing offset in accordance with the present invention and including enhancements to both the CM and CMTS comprises: (1) the CMTS learning or determining the relative delay of each CM as illustrated by block 1610; (2) the CMTS reporting the CM's unique delay (relative to the closest CM) to the CM as illustrated by block 1612; (3) the CMTS monitoring its own reference for frequency drift as illustrated by block 1614; (4) the CMTS broadcasting pertinent frequency drift information to the CMs as illustrated by block 1616; and (5) adjusting the CMs' upstream timing to account for each CM's unique distance (i.e., delay) combined with the broadcast stream of frequency drift information as illustrated by block 1618.

In accordance with one embodiment, the relative delay of each CM may be determined by setting the CM to an uninitialized mode. Setting the CM to such uninitialized mode forces the CM to "forget", at least momentarily, any timing offset information previously provided or "told" to it. It may then be determined when the CM responds to an initial maintenance interval. It is contemplated that, for modems provided by the same manufacturer, the only difference in response delay should be the actual two-way propagation distance. For modems that are not provided by the same manufacturer, other factors may impact such difference in initial delay.

This embodiment further comprises the CMTS reporting the delay difference to each CM. It is contemplated that such delay distance may be measured from the closest CM. The CMTS may report the delay difference using special proprietary messaging set forth in the DOCSIS Standard or some other new messaging not currently set forth in the DOCSIS Standard.

It should be appreciated that one or more CMs may be added to the communication systems that are closer to the CMTS than the current closest CM. One embodiment of the present invention provides using such messaging to enable the reset of each CMs delay parameter. Another embodiment is contemplated in which messaging broadcasts an addition or subtraction of some predetermined amount of delay to each CM. It is contemplated that this delay parameter is not sensitive to the nanosecond accuracy required for the actual upstream timing. Small errors in this delay parameter (on the order of one or more nanoseconds up to about one microsecond) should not have any meaningful impact on the error mechanism mitigated in accordance with the present invention. Therefore a variation of the plant delay of even hundreds of nanoseconds (which could render SCMDA modulation unusable) does not impact the mitigation of the error mechanism corrected using one embodiment of the present invention.

One embodiment of the method further comprises the CMTS monitoring its own frequency drift. This embodiment comprises each CM monitoring its view of the downstream symbol clock frequency drift. However, such monitoring is likely to be dominated by the CM oscillator's own drift, and may not be strongly related to the CMTS drift. Thus, it may be desirable to provide some further modification at the CM.

Another embodiment for monitoring the CMTS frequency drift comprises the CMTS monitoring its frequency drift relative to some stable reference, GPS time for example. Yet another embodiment comprises building a delay at the CMTS, and carefully measuring the frequency (or phase) of the delayed reference with the non-delayed reference at the CMTS itself. It is contemplated that this is similar to measuring the actual derivative of the CMTS frequency versus time. By carefully measuring the frequency delta of the CMTS reference, keeping track of this frequency evolution, and smoothing (or averaging over some short time intervals such as milliseconds), the necessary information for mitigating the error mechanism is made available.

Yet still another embodiment for monitoring the CMTS's frequency drift comprises using a frequency discriminator, used in FM receivers for example. Monitoring the frequency versus time of the CMTS frequency reference, and reporting any change in the frequency every second in broadcasts to the CMs, should be sufficient to mitigate the accrual of timing error due to CMTS frequency drift to an acceptable level.

Further embodiments of the present invention include reporting actual frequency, frequency relative to nominal, changes in frequency, or CMTS frequency from nominal normalized by nominal (which is independent on downstream symbol rate, then, or if the 10.24 MHz clock is used for the measurement), and how often to make such report (more or less than once per second). It is contemplated that what to report and how often to report are important so that CMs and CMTS "are on the same page". One embodiment contemplates reporting actual frequency from nominal, normalized by nominal, with $10^{-8}$ exponent assumed, since missing one broadcast value will not result in a continuing error.

Finally, one embodiment of the method further comprises compensation of the timing at the CM. The CM accepts the frequency drift or frequency evolution information from the CMTS (pertaining to the CMTS frequency reference). The CM uses the delay difference (relative to closest CM), and computes and implements an adjustment to its upstream timing. The update amount for the CM to implement is:

$$[\text{delta}F \text{ (Hz)}/F\text{nominal (Hz)}] \times t_d(\text{seconds}) = \text{timing adjustment for upstream at } CM, \text{ in seconds}.$$

In this formula, element deltaF is expressed in units of Hz, and represents the change in the CMTS reference frequency from the last reporting. Element Fnominal is expressed in units of Hz, and represents the nominal value of the frequency of reference at the CMTS. It is contemplated that Fnominal may be a downstream symbol rate, the 10.24 MHz Master Clock, or any other synchronized clock. Element $t_d$ represent the amount of excess delay (in seconds) of the CM doing the computation, where the excess delay is two-way delay (including differences in implementation) relative to the closest or least delayed CM in the CMTS's control.

If the actual (normalized) frequencies are broadcast by the CMTS, then element deltaF represents the difference computed at the CM. Element deltaF is normalized by the nominal frequency of the CMTS reference clock. It is also contemplated that one embodiment of the present invention incorporates this normalization into the CMTS prior to broadcast, broadcasting such actual values. This embodiment would leave it to the CM to difference such actual values to generate the deltas.

In this embodiment, the change in normalized CMTS reference frequency from the prior broadcast is multiplied by the excess delay of a respective CM. The resultant is the amount of time, in seconds, that the respective CM is lagging the closest or least-delayed CM. If the deltaF is positive, one embodiment of the present invention contemplates the CM advancing its upstream symbol timing by this amount. If however deltaF is negative, then the CM delays its upstream symbol timing by this amount.

It should be appreciated that, while the above describe embodiments are described with respect to a communication system having it physical layers specified in the DOCSIS Standard (a cable system for example), this invention is not limited to such communication or other wired systems. This invention is applicable to any system wherein critical timing synchronization of return transmissions is necessary, the timing reference is from a forward transmission which has frequency drift, and wherein feedback from the forward transmitter to the return transmitters of their alignment performance is relatively infrequent Many modifications and variations of the present invention are possible in light of the above teachings. Thus, it is to be understood that, within the scope of the appended claims, the invention may be practiced otherwise than as described hereinabove.

The invention claimed is:

1. A communication system adapted to mitigate timing offset in return transmissions, comprising:
   at least one modem, said at least one modem adapted to report its delay relative to a delay associated with a particular one of a plurality of modems that is the closest one of the plurality of modems to a head end; and
   a headend adapted to determine relative delay of said at least one modem and monitor its own reference for frequency drift,
   wherein said at least one modem is adapted to adjust its upstream timing to account for said delay.

2. A headend for mitigating timing off set in a system having critical timing synchronization of return transmissions, comprising:
   a first circuit for receiving reported relative delays from a plurality of modems, wherein relative delays comprise at least one of the plurality of modems' delays relative to a particular one of the plurality of modems that is the closest one of the plurality of modems to a headend;
   a second circuit for monitoring frequency drift;
   a third circuit for broadcasting information on said frequency drift; and
   wherein broadcasting said information on said frequency drift comprises broadcasting said information to each of the plurality of modems using actual frequency normalized by nominal frequency.

3. The head end of claim 2, wherein receiving reported relative delay further comprises receiving proprietary messaging.

4. The head end of claim 2, wherein monitoring said frequency drift further comprises monitoring frequency drift relative to a stable reference.

5. The head end of claim 2, wherein monitoring said frequency drift comprises building a delay at the headend in the system and measuring a frequency a delayed reference.

6. The head end of claim 2, wherein the second circuit for monitoring said frequency drift a frequency discriminator.

* * * * *